(12) United States Patent
Sullivan

(10) Patent No.: US 10,363,814 B2
(45) Date of Patent: Jul. 30, 2019

(54) TRANSFER CASE WITH OIL DISTRIBUTION

(71) Applicant: BorgWarner Inc., Auburn Hills, MI (US)

(72) Inventor: Christopher Sullivan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 412 days.

(21) Appl. No.: 15/204,446

(22) Filed: Jul. 7, 2016

(65) Prior Publication Data

US 2018/0010649 A1    Jan. 11, 2018

(51) Int. Cl.
| | | |
|---|---|---|
| *B60K 17/35* | (2006.01) | |
| *B60K 23/08* | (2006.01) | |
| *F16D 13/74* | (2006.01) | |
| *B60K 17/344* | (2006.01) | |
| *F16D 13/52* | (2006.01) | |

(52) U.S. Cl.
CPC .......... *B60K 17/344* (2013.01); *B60K 17/35* (2013.01); *B60K 23/0808* (2013.01); *F16D 13/52* (2013.01); *F16D 13/74* (2013.01); *B60K 2023/085* (2013.01); *B60K 2023/0883* (2013.01); *B60Y 2400/424* (2013.01); *B60Y 2400/73* (2013.01); *B60Y 2400/732* (2013.01); *F16D 2300/06* (2013.01)

(58) Field of Classification Search
CPC ...... B60K 17/34; B60K 17/344; B60K 17/35; B60K 23/0808; B60K 2023/085; B60K 2023/0858; B60K 2023/0875; F16D 13/648; F16D 13/74; F16D 2300/06; F16H 57/043; F16H 57/0435; F16H 57/0473
USPC ................................................... 192/113.35
See application file for complete search history.

(56) References Cited

U.S. PATENT DOCUMENTS

| | | | | |
|---|---|---|---|---|
| 5,704,863 | A * | 1/1998 | Zalewski | ............. B60K 17/344 180/247 |
| 8,428,838 | B2 * | 4/2013 | Kondo | ................... B60K 23/08 701/69 |
| 9,638,314 | B2 * | 5/2017 | Cradit | ................. F16H 57/0473 |
| 2016/0097445 | A1 * | 4/2016 | Jongebloed | ........... F16H 57/043 74/405 |

* cited by examiner

*Primary Examiner* — Richard M Lorence
(74) *Attorney, Agent, or Firm* — Young Basile Hanlon & MacFarlane, P.C.

(57) ABSTRACT

A transfer case includes a primary output shaft, a secondary output shaft, a clutch, and a hub. The clutch includes a plurality of interleaved plates for selectively rotationally coupling the primary output shaft to the secondary output shaft. The hub rotationally couples the primary output shaft and the clutch. The hub includes an outer annular member and an inner annular member. The inner annular member is rotatable within the outer annular member for the hub to selectively release oil into the clutch.

19 Claims, 5 Drawing Sheets

TRANSFER CASE WITH OIL DISTRIBUTION

CROSS-REFERENCE TO RELATED APPLICATIONS

Not applicable.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft. The primary output shaft is driven generally constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

Oil may be provided to the clutch, for example, to cool the clutch that engages the secondary output shaft. However, when the clutch is not engaged and the secondary output shaft is not driven, a continued supply of oil can create drag or friction (e.g., due to shearing of the oil between plates of the clutch) on the primary output shaft, which can reduce efficiency of the vehicle. It would, therefore, be advantageous to provide a transfer case in which oil is selectively provided to the clutch when needed.

SUMMARY

A transfer case includes a primary output shaft, a secondary output shaft, a clutch, and a hub. The clutch includes a plurality of interleaved plates for selectively rotationally coupling the primary output shaft to the secondary output shaft. The hub rotationally couples the primary output shaft and the clutch. The hub includes an outer annular member and an inner annular member. The inner annular member is rotatable within the outer annular member for the hub to selectively release oil into the clutch.

A hub for a transfer case includes an outer annular member, an inner annular member, and a spring. The inner annular member is within and rotatable relative to the outer annular member in a limited range of motion between a first position and a second position relative to the outer annular member. The spring is coupled to the outer annular member and the inner annular member, and normally biases the inner annular member into the first position. The hub forms a closed valve when the inner annular member is in the first position, and forms an open valve when the inner annular member is in the second position.

A transfer case includes a primary output shaft, a secondary output shaft, a clutch, and a hub. The clutch is configured to selectively rotationally couple the primary output shaft to the secondary output shaft. The hub rotationally couples the primary output shaft to the clutch, releases oil to the clutch when the clutch is engaged, and substantially prevents release of the oil to the clutch when the clutch is disengaged.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
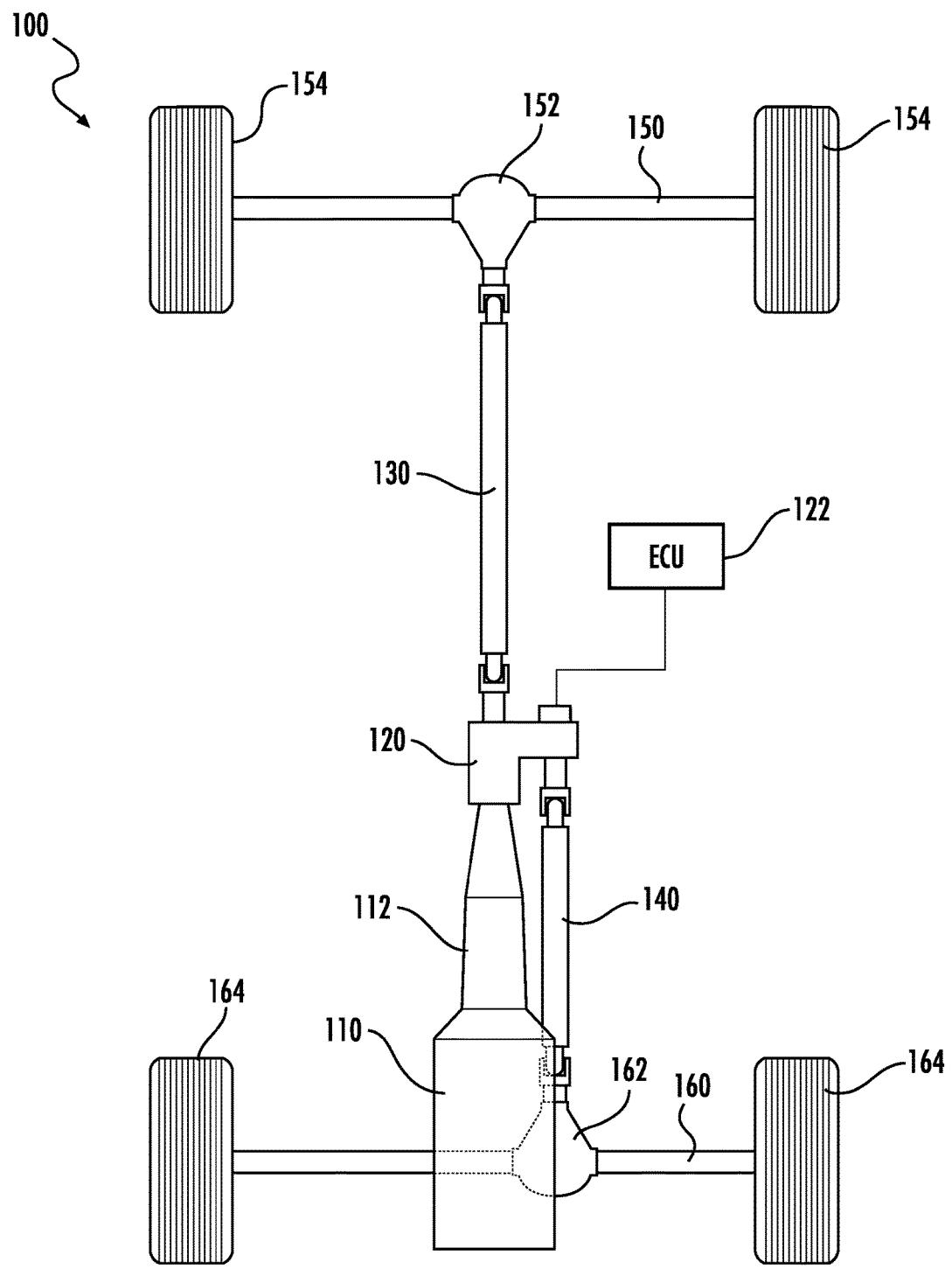
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, wherein the transfer case 120 performs a mode shift between a front-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
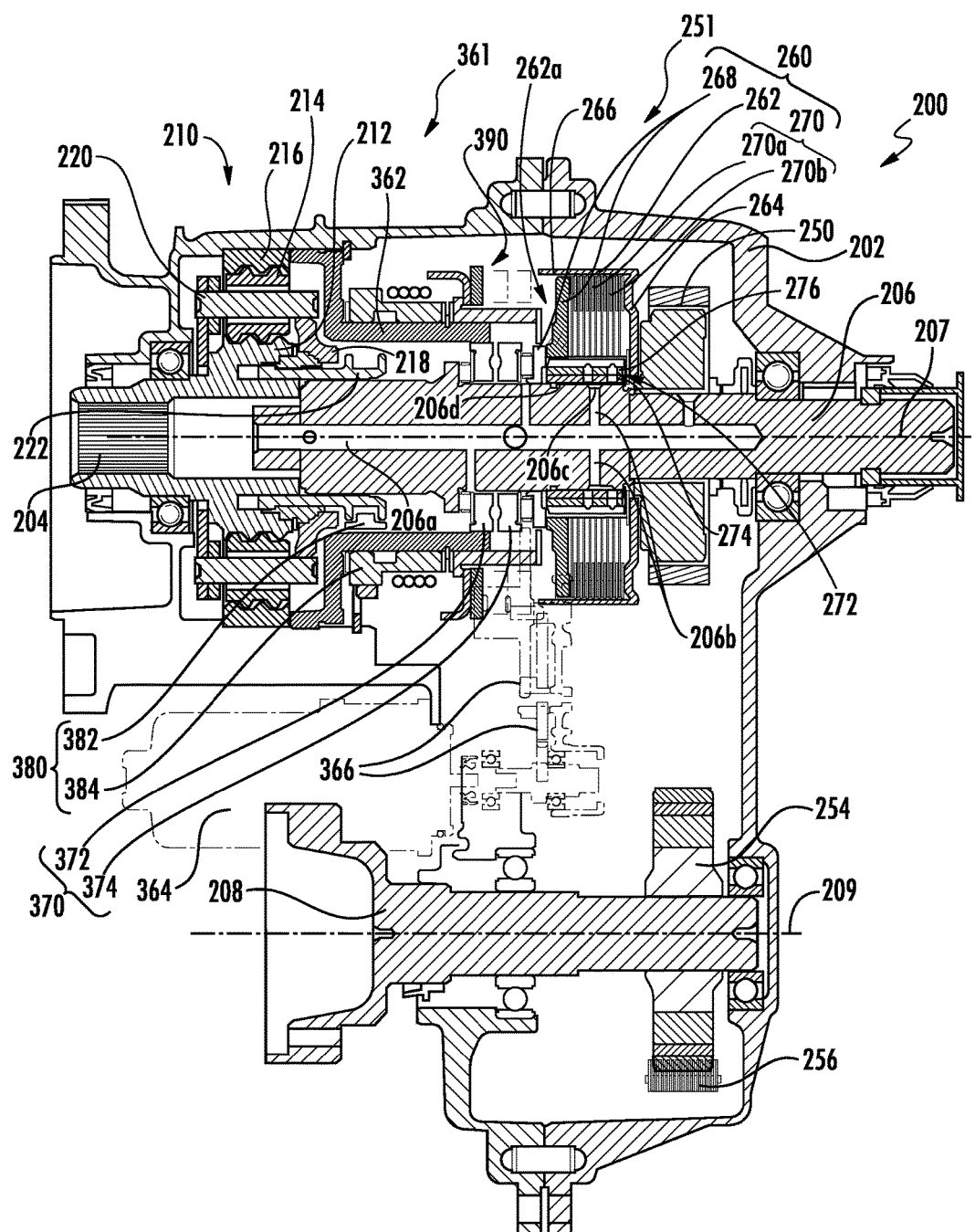
FIG. 2 is a cross-section illustration showing a transfer case according to an exemplary embodiment.
Figure 3:
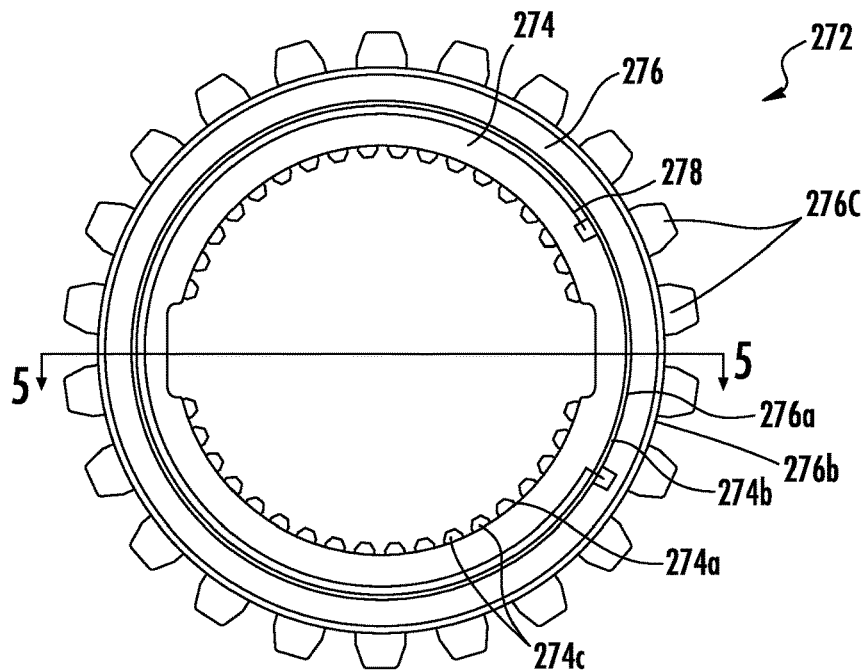
FIG. 3 is an axial end view of a hub assembly of the transfer case shown in FIG. 2.
Figure 4:
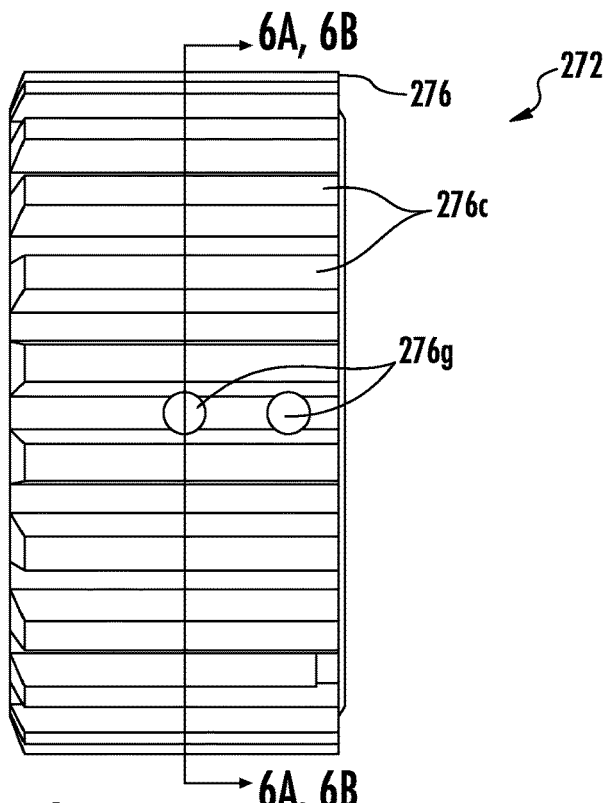
FIG. 4 is a radial side view of the hub assembly shown in FIG. 3.
Figure 5:
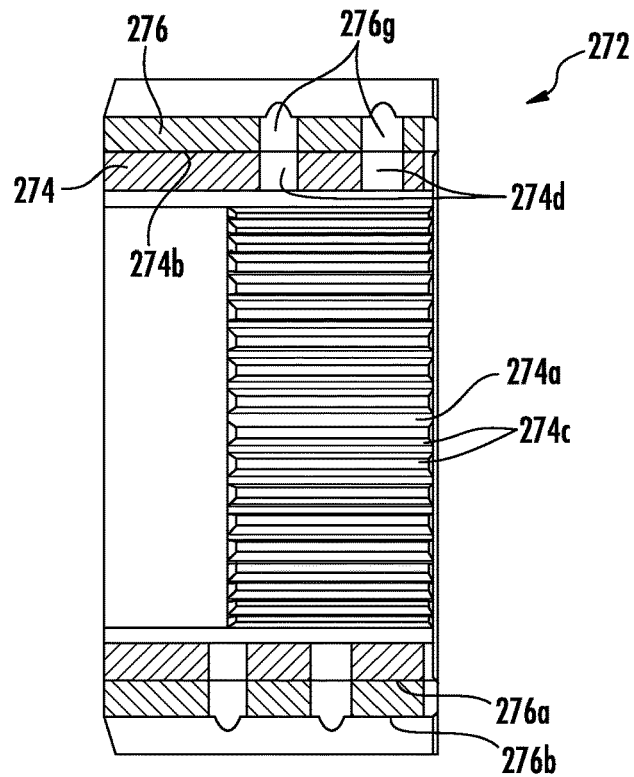
FIG. 5 is a cross-sectional view of the hub assembly taken along line 5-5 from FIG. 3.

As shown in FIG. 2, a transfer case 200 generally includes a gear reduction system or mechanism 210 and a secondary torque transfer system or mechanism 251. The gear reduction system 210 is configured to transfer torque selectively at different drive ratios from an input shaft 204 to a primary output shaft 206 and is operable by a reduction actuation mechanism 380. The secondary torque transfer mechanism 251 (e.g., secondary torque transfer system) is configured to selectively transfer torque between the primary output shaft 206 (e.g., the rear output or drive shaft 130) and a secondary output shaft 208 (e.g., the front output shaft 140), and is operable by a torque transfer actuation mechanism 370. In the discussion that follows, directional terminology (e.g., front, forward, back, rearward, etc. generally refers to an orientation in which the transfer case 200 may be installed in a vehicle (e.g., in the cross-sections shown in FIG. 2, the left side is the front of the transfer case 200, while the right side is the rear of the transfer case 200). However, such directional terminology is for reference only, as other mounting orientations of the transfer case 200 are possible. Furthermore, in some embodiments of the transfer case 200, the gear reduction system 210 may be omitted.

The transfer case 200 includes a housing 202 and rotating components, which include the input shaft 204, the primary output shaft 206, and the secondary output shaft 208 that each extend out of and rotate relative to the housing 202. The input shaft 204 and the primary output shaft 206 extend along a central axis 207 (e.g., first axis). The secondary output shaft 208 extends along a second axis 209 which is, in this example, parallel to the central axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position, the gear reduction hub 222 is positioned axially forward (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

An actuator system 361 is configured to move the reduction hub 222 of the gear reduction mechanism 210 between its first (i.e., forward) and second (i.e., rearward positions). The actuator system 361 includes the reduction actuator mechanism 380, which is configured as a barrel cam mechanism having a rotating barrel 384 and a fork member 382 that engages the gear reduction hub 222. The rotating barrel 384 is configured to rotate about a base 362 (e.g., inner annular or stationary member) and includes internal helical slots (not labeled) that engage ends of the fork member 382. As the rotating barrel 384 is rotated (e.g., by an electric motor 364 and/or intermediate gears or gear assemblies 366, 390), the fork member 382 is moved axially forward and rearward so as to move the reduction hub 222 between its first and second positions. The actuator system 361 is additionally configured to operate the clutch 260 as discussed below. According to other embodiments, the gear reduction system 210 may be operated by a different type of actuator and/or an actuator that is separate from that operating the clutch 260.

The secondary torque transfer mechanism 251 is configured to transfer torque from the primary output shaft 206 to the secondary output shaft 208. A first sprocket 250 (e.g., rotating member) is arranged around the primary output shaft 206 and is selectively rotationally coupled to the primary output shaft 206 by a plate clutch 260. A second sprocket 254 is arranged on the secondary output shaft 208 and is fixedly rotationally coupled thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the clutch 260 is engaged.

The clutch 260 is configured to selectively transfer torque between the primary output shaft 206 and the first sprocket 250 and, ultimately, the secondary output shaft 208. The plate clutch 260 generally includes a housing 262 (e.g., drum), an apply plate 268 (e.g., pressure plate), and a plurality of interleaved plates 270. The apply plate 268 is configured to compress the interleaved plates 270 together to increase friction and transfer torque therebetween, which then transfer torque from the primary output shaft 206 to the housing 262.

The housing 262 forms a substantially cylindrical cavity 262a that contains the interleaved plates 270. The primary output shaft 206 also extends through the cylindrical cavity 262a and can rotate independent of the housing 262. More particularly, the housing 262 includes a base 264 (e.g., plate) that extends radially outward away from the primary output shaft 206, and also includes an annular flange 266 that is coupled to and extends axially from the base 264 to define the cylindrical cavity 262a. The base 264 is fixedly coupled to the first sprocket 250, so as to transfer torque thereto and, ultimately, to the secondary output shaft 208 when the clutch 260 is engaged.

The interleaved plates 270 are configured to transfer torque between the primary output shaft 206 and the clutch housing 262. The interleaved plates 270 alternate between being rotationally coupled to the clutch housing 262 and the primary output shaft 206. A first subset 270a of the interleaved plates 270 (e.g., a first alternating group or subset) form an axially sliding, splined connection with an inner periphery (not labeled) of the annular flange 266 of the clutch housing 262. The inner periphery of the annular flange 266 includes splines (not labeled) of corresponding dimension to splines (not labeled) on an outer periphery (not labeled) of each of the interleaved plates 270 of the first subset 270a. The splines on the inner periphery of the annular flange 266 of the clutch housing 262 engage the splines of the interleaved plates 270 of the first subset 270a to transfer torque therebetween (i.e., rotationally couple), while also allowing the interleaved plates 270 to move axially therealong, as the interleaved plates 270 are compressed and decompressed.

A second subset 270b of the interleaved plates 270 (e.g., a second alternating group or subset) is rotationally coupled to the primary output shaft 206. More particularly, the second subset 270b of the interleaved plates 270 is rotationally coupled to the primary output shaft 206 by way of a hub 272. The second subset 270b of the interleaved plates 270 form an axially sliding, splined connection with the hub 272, while the hub 272 is fixedly rotationally coupled to the primary output shaft 206. As discussed in further detail below, the hub 272 is a multi-piece assembly that functions as a valve to selectively release oil into the housing 262 of the clutch 260.

The apply plate 268 is configured to compress the interleaved plates 270 together to increase friction therebetween and, thereby, transfer torque between the primary output shaft 206, which forms a rotational coupling with the second subset of the interleaved plates 270 via the hub 272, and the clutch housing 262, which forms a rotational coupling with the first subset of the interleaved plates 270. The apply plate 268 is a multi-piece assembly, or may be a unitary member, that is moved by the actuator system 361 axially toward the clutch housing 262 to compress the interleaved plates 270 against the base 264 of the clutch housing 262.

The actuator system 361 includes a ball cam mechanism 370 having forward and rearward annular members 372, 374. As one of the annular members (e.g., the rearward annular member 374) is rotated relative to the other (e.g., by the motor 364 and intermediate gears 366 and gear assembly 390), the rearward annular member 374 displaces axially to move the apply plate 268 rearward. Bearings (not labeled) are positioned between the rearward annular member 374 and the apply plate 268 to allow relative rotation therebetween, as the apply plate 268 may be splined to rotate with the primary output shaft 206 (e.g., via the hub 272). The actuator system 361 may be configured such that the barrel cam mechanism 380 and the ball cam mechanism 370 operate at different stages of rotation of the motor 364, for example, by having dwell regions. According to other exemplary embodiments, the apply plate 268 may be operated (i.e., moved) by another type of actuation system (e.g., linear actuators) and/or may be operated by another actuator system 361 that is separate from that operating the gear reduction mechanism 210. According to still further embodiments, the clutch 260 may instead or additionally be configured with the apply plate 268 at a rearward end of the transfer case 200.

The hub 272 is a multi-piece assembly, which functions both to transfer torque between the primary output shaft 206 and the second subset 270b of the interleaved plates 270 and also as a valve for selectively releasing oil supplied through the primary output shaft 206 into the housing 262 of the clutch 260. More particularly and as discussed in further detail below, the hub 272 is configured to release oil as the clutch 260 is actuated.

The primary output shaft 206 includes a central conduit 206a (e.g., central or main channel or bore) extending axially through a center thereof, and a plurality of branch conduits 206b (e.g., branches or branch conduits or bores) that are in fluidic communication with and extend radially outward from the central conduit 206a. The central conduit 206a is in fluidic communication with an oil source (not labeled) for receiving oil therefrom. The primary output shaft 206 additionally includes a peripheral channel 206d (e.g., circumferential or outer channel) that extends circumferentially around the primary output shaft 206. The peripheral channel 206d forms a recess in the outer periphery 206c of the primary output shaft 206 and distributes oil received from the branch conduits 206b entirely around the primary output shaft 206. For example, the primary output shaft 206 may include two branch conduits 206b that are spaced 180 degrees apart (e.g., as a single bore extending radially through the primary output shaft 206).

The hub 272 generally includes an inner annular member 274, an outer annular member 276, and a spring 278. The inner annular member 274 is located generally within and concentric to the outer annular member 276. The inner annular member 274 is rotatable relative to the outer annular member 276 in a predefined range of motion between a first position (e.g., disengaged or closed position) in which the hub 272 functions as a closed valve and a second position (e.g., engage or closed position) in which the hub 272 functions as an open valve. The inner and outer annular members 274, 276 are, for example, unitary, hardened steel components that are made from any suitable combination of casting, forging, extruding, machining, etc. processes.

Referring to FIGS. 3-6B, the inner annular member 274 is configured to transfer torque between the primary output shaft 206 and the outer annular member 276. The inner annular member 274 includes an inner periphery 274a and an outer periphery 274b. The inner periphery 274a includes a first plurality of splines 274c (e.g., inner splines or inner hub splines), which engage corresponding splines (not labeled) on an outer periphery 206c of the primary output shaft 206, so as to rotationally couple and transfer torque between the inner annular member 274 and the primary output shaft 206.

The outer periphery 274b of the inner annular member 274 is configured relative to an inner periphery 276a of the outer annular member 276 to allow limited relative rotation therebetween, while also transferring torque therebetween. The outer periphery 274b of the inner annular member 274 has a diameter that is slightly smaller than that of the inner periphery 276a of the outer annular member 276. The inner annular member 274 additionally includes a plurality of protrusions 274e (e.g., splines, teeth, etc.) that extend radially outward from the outer periphery 274b and are spaced circumferentially at substantially equal circumferential positions about the central axis 207 (e.g., at quarter turns). When the hub 272 is assembled, the protrusions 274e of the inner annular member 274 are positioned within corresponding slots 276d in the inner periphery 276a of the outer annular member 276 as discussed in further detail below.

The inner annular member 274 includes a plurality of apertures 274d, which are configured to receive oil from the peripheral channel 206d of the primary output shaft 206 and supply the oil to the outer annular member 276. The apertures 274d (e.g., inner radial apertures or holes or inlets) extend radially from the inner periphery 274a to the outer periphery 274b of the inner annular member 274, so as to receive and communicate oil radially outward from the primary output shaft 206 at a radially inward location to the outer annular member 276 at a radially intermediate location. The apertures 274d are spaced circumferentially about the central axis 207 of the primary output shaft 206 at substantially equal circumferential positions (e.g., half turns), which are different than the circumferential positions of the protrusions 274e (see FIGS. 6A-6B). Multiple apertures 274d may be provided at each circumferential position, and are spaced apart axially at different axial positions (see FIG. 5). For example, as shown in the figures, two apertures 274d are axially spaced apart at each of two circumferential positions that are 180 degrees apart, which results in four total apertures 274d.

The apertures 274d may, for example, be substantially cylindrical having an axis that extends radially at a perpendicular to the central axis 207 and having a diameter of between approximately 2 mm and 6 mm (e.g., approximately 4 mm). The number and size of the apertures 274d may be configured to achieve a desirable cumulative flow rate of oil through the apertures 274d and into the housing 262 of the clutch 260. According to other embodiments, the apertures 274d may be provided in different circumferential and axial locations, in different number, and in different sizes.

Figure 6A:
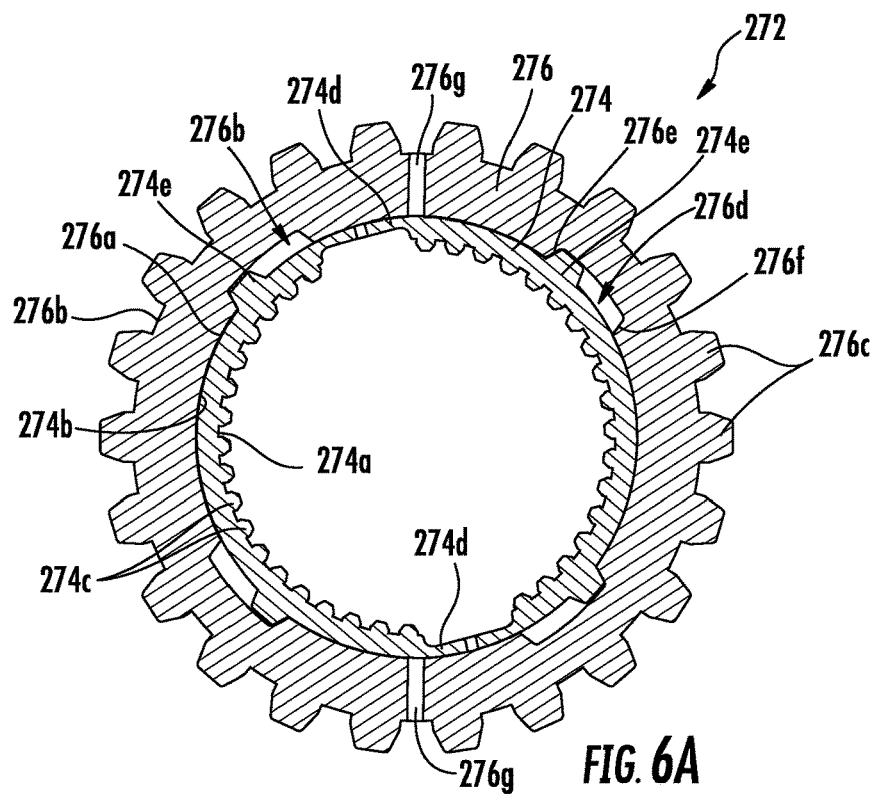
FIG. 6A is a cross-sectional view of the hub assembly taken along line 6A-6A from FIG. 4, which shows the hub assembly in a first state.
Figure 6B:
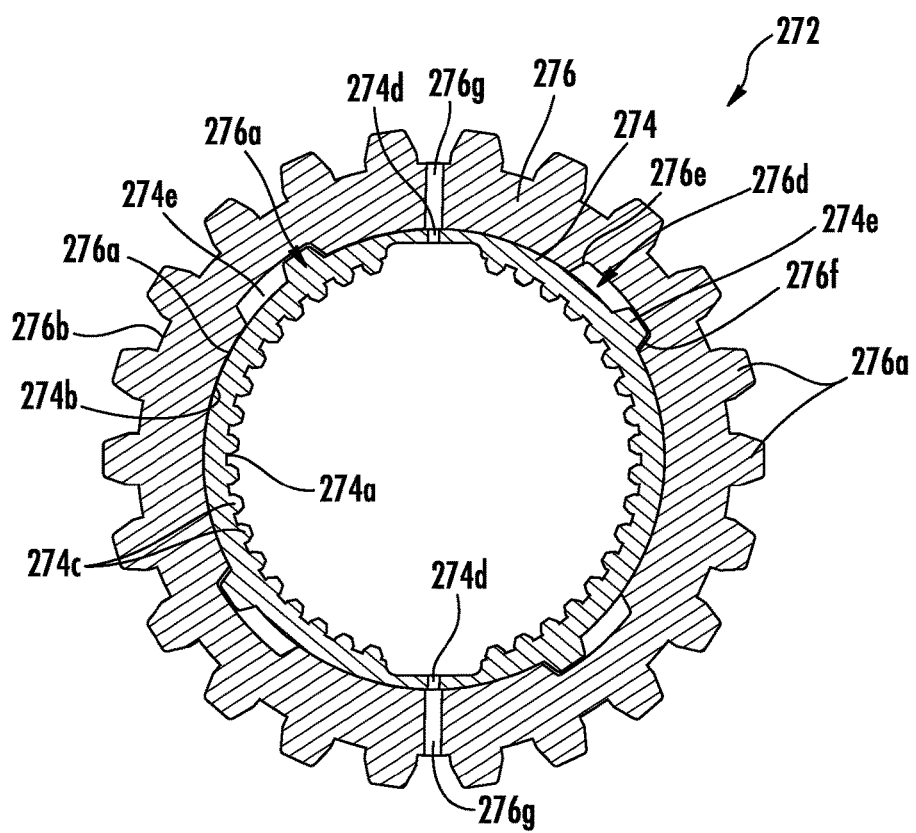
FIG. 6B is a cross-sectional view of the hub assembly taken along line 6B-6B from FIG. 4, which shown the hub assembly in a second state.

To help distribute oil in the axial direction from the peripheral channel 206d of the primary output shaft 206, the inner annular member 274 may not include inner splines 274c at the circumferential position corresponding to the apertures 274d (see FIGS. 6A and 6B). The splines (not labeled) of the primary output shaft 206 at corresponding locations to omitted splines 274c are, thereby, not blocked by inner splines 274c of the inner annular member 274. This allows oil to flow in axial directions from the peripheral channel 206d of the primary output shaft 206 to the apertures 274d at positions axially offset from the peripheral channel 206d.

The outer annular member 276 is configured to transfer torque between the inner annular member 274 and the second subset 270b of the interleaved plates 270. The outer annular member 276 includes the inner periphery 276a and an outer periphery 276b. The inner periphery 276a of the outer annular member 276 includes the plurality of slots 276d (e.g., recesses), which receive the corresponding protrusions 274e of the inner annular member 274. The slots 276d are recesses that extend radially outward into the outer annular member 276. The slots 276d have a circumferential width, extending between side or end walls 276e, 276f thereof, that allows the inner annular member 274 to rotate relative to the outer annular member 276 in the limited range of motion between the first position and the second position. The limited or predetermined range of motion may, for example, be between approximately 3 and 45 degrees (e.g., between 5 and 15 degrees), or other greater or lesser suitable angle or distance.

As discussed in further detail below, when the primary output shaft 206 is rotating in a primary direction (i.e., for forward motion of the vehicle) and the clutch 260 is engaged, the inner annular member 274 is moved to the second position in which its protrusions 274e simultaneously engage the second side wall 276f of the outer annular member 276 to transfer torque thereto (see FIG. 6B). The walls 276e and/or 276f of each slot 276d of the outer annular member 276 may additionally include a bumper (e.g., of a resilient material that is softer than a material forming the walls 276e, 276f), so as to absorb impacts when the inner annular member 274 is moved between the first and second positions.

The outer periphery 276b includes a second plurality of splines 276c (e.g., outer splines or outer hub splines), which engage corresponding splines (not labeled) on an inner periphery of the second subset 270b of the interleaved plates 270 to transfer torque therebetween and which also allow the second subset 270b of the interleaved plates 270 to slide axially therein (e.g., when the interleaved plates 270 are compressed and decompressed). The outer splines 276c and the corresponding splines of the second subset of the interleaved plates 270 thereby rotationally couple and transfer torque between the outer annular member 276 and the second subset 270b of the interleaved plates 270.

The outer annular member 276 additionally includes a plurality of outer apertures 276g (e.g., outer radial apertures or holes or outlets) that extend radially from the inner periphery 276a to the outer periphery 276b. The apertures 276g of the outer annular member 276 receive and communicate oil radially outward from the apertures 274d of the inner annular member 274 at the radially intermediate location into the housing 262 of the clutch 260 at a radially outward location. The apertures 276g of the outer annular member 276 are spaced circumferentially about the central axis 207 and axially there along at corresponding positions to the apertures 274d of the inner annular member 274. Thus, when the inner annular member 274 is in the second position, each of the apertures 274d of the inner annular member 274 are simultaneously aligned with each corresponding aperture 276g of the outer annular member 276, thereby releasing oil into the housing 262 of the clutch 260 (i.e., the hub 272 functions as an open valve).

The apertures 276g of the outer annular member 276 may, for example, be substantially cylindrical having an axis that extends radially perpendicular to the central axis 207 and having a diameter of between approximately 4 mm and 8 mm (e.g., approximately 6 mm). The apertures 276g of the outer annular member 276 may also be larger than the corresponding apertures 274d of the inner annular member 274, for example, by having a diameter that is between approximately 1 mm and 3 mm (e.g., approximately 2 mm) larger. The larger size of the apertures 276g of the outer annular member 276 allows for slight misalignment relative to the apertures 274d of the inner annular member 274 without restricting flow. According to other embodiments, the apertures 276g may be provided in different circumferential and axial locations, in different number, and in different sizes.

The spring 278 is configured for the inner annular member 274 to move between the first position and the second position relative to the outer annular member 276 during normal operation of the clutch. More particularly, the spring 278 normally biases the inner annular member 274 to the first position in which the hub 272 functions as a closed valve (see FIG. 6A). The inner annular member 274 is moved to the second position in which the hub 272 functions as an open valve (see FIG. B) due to a combination of increased friction between the interleaved plates 270 as they are compressed and rotation of the primary output shaft 206 in the primary direction, which cooperatively overcome the force of the spring 278 (e.g., compresses the spring 278) to move the inner annular member 274 to the second position.

The spring 278 is configured as a clock spring having one end coupled to the inner annular member 274 and another end coupled to the outer annular member 276. The spring 278 is configured to apply sufficient force to normally bias the inner annular member 274 to the first position relative to the outer annular member 276 when the clutch 260 is not engaged (i.e., the interleaved plates 270 are not compressed together). The spring 278 applies sufficient counter-torque (i.e., in a direction opposite the primary direction of rotation) from the outer annular member 276 to the inner annular member 274 to overcome any residual friction between the first subset 270a of the interleaved plates 270 (i.e., those rotationally coupled to the housing 262 of the clutch 260) and the second subset 270b of the interleaved plates 270 (i.e., those rotationally coupled to the outer annular member 276). This residual friction may be due to, for example, incidental interference and/or shearing of oil between the first and second subsets 270a, 270b of the interleaved plates. Accordingly, with the clutch 260 disengaged, the inner annular member 274 remains in its first position with its protrusion 274e engaged with the first wall 276e of the slot 276d of the outer annular member 276. The apertures 274d of the inner annular member 274 are also out of alignment with the corresponding apertures 276g of the outer annular member 276 to prevent release of oil into the housing 262 of the clutch 260 (i.e., the hub 272 functions as a closed valve). Further, the hub 272, as an entire assembly, and the second subset of 270b of the interleaved plates 270 rotate with the primary output shaft 206 in the primary direction, while the first subset 270a of the interleaved plates 270 and the housing 262 of the clutch 260 remain generally stationary.

The spring force of the spring 278 is also configured to be overcome as the clutch 260 is engaged to move the inner annular member 274 to the second position relative to the outer annular member 276. As the primary output shaft 206 is rotated in the primary direction (i.e., for forward motion of the vehicle) and as the clutch 260 is engaged to compress the interleaved plates 270 together (i.e., simultaneous engagement of the clutch 260 and rotation of the primary output shaft 206), friction is increased between the first subset 270a of the interleaved plates 270 (i.e., those rotationally coupled to the housing 262 of the clutch 260) and the second subset 270b of the interleaved plates 270 (i.e., those rotationally coupled to the outer annular member 276). The interleaved plates 270 apply a counter-torque (i.e., in a direction opposition the primary direction of rotation) to the outer annular member 276 that overcomes the spring force of the spring 278. The inner annular member 274 is, thereby, moved to the second position relative to the outer annular member 276. In the second position, the protrusions 274e of the inner annular member 274 engage the second walls 276f of the slots 276d in the outer annular member 276 to transfer torque therebetween. The apertures 274d, 276g of the inner and outer annular members 274, 276, respectively, are also in substantial alignment to release oil into the housing 262 of the clutch 260 (i.e., the hub 272 functions as an open valve). When the interleaved plates 270 are fully compressed, the hub 272, as an entire assembly, the interleaved plates 270, and the housing 262 of the clutch 260 rotate with the primary output shaft 206 in the primary direction.

While the disclosure has been made in connection with what is presently considered to be the most practical and preferred embodiment, it should be understood that the disclosure is intended to cover various modifications and equivalent arrangements.

The invention claimed is:
1. A transfer case comprising:
a primary output shaft;
a secondary output shaft;
a clutch having a plurality of interleaved plates for selectively rotationally coupling the primary output shaft to the secondary output shaft; and
a hub rotationally coupled to the primary output shaft and the clutch, the hub comprising:
an outer annular member; and
an inner annular member rotatable within the outer annular member between a first position, in which the hub prevents release of oil into the clutch, and a second position, in which the hub releases oil into the clutch, the hub being biased towards the first position.

2. The transfer case according to claim 1, wherein the inner annular member is rotatable within a predetermined range of motion between the first position and the second position.

3. The transfer case according to claim 2, wherein the predetermined range of motion is between approximately 5 and 15 degrees.

4. The transfer case according to claim 2, wherein the inner annular member includes a first plurality of apertures, and the outer annular member includes a second plurality of apertures in corresponding positions to the first plurality of apertures,
wherein in the first position, the first plurality of apertures and the second plurality of apertures are not in alignment to prevent flow of the oil therethrough, and in the second position, the first plurality of apertures and the second plurality of apertures are in alignment to allow flow of the oil therethrough.

5. The transfer case according to claim 4, where the first plurality of apertures have a first diameter, and the second plurality of apertures have a second diameter that is larger than the first diameter.

6. The transfer case according to claim 4, wherein the first plurality of apertures includes at least two apertures at different circumferential positions.

7. The transfer case according to claim 4, wherein the first plurality of apertures includes at least two apertures at different axial positions.

8. A transfer case comprising:
a primary output shaft;
a secondary output shaft;
a clutch having a plurality of interleaved plates for selectively rotationally coupling the primary output shaft to the secondary output shaft; and
a hub rotationally coupled to the primary output shaft and the clutch, the hub comprising:
an outer annular member; and
an inner annular member rotatable within the outer annular member for the hub to selectively release oil into the clutch, wherein the inner annular member is rotatable within a predetermined range of motion between a first position in which the hub prevents release of the oil into the clutch and a second position in which the hub releases the oil into the clutch, wherein the hub further comprises a spring that normally biases the inner annular member to the first position, and wherein the inner annular member is moved to the second position upon simultaneous engagement of the clutch and rotation of the primary output shaft.

9. The transfer case according to claim 8, wherein the inner annular member is fixedly rotationally coupled to the primary output shaft, the outer annular member is fixedly rotationally coupled to a subset of the plurality of the interleaved plates, and compressing the interleaved plates together increases friction therebetween sufficient to compress the spring and move the inner annular member to the second position.

10. The transfer case according to claim 8, wherein the inner annular member includes a plurality of protrusions extending radially outward from an outer periphery thereof, and the outer annular member includes a plurality of recesses extending radially outward from an inner periphery thereof, each protrusion being positioned within one of the recesses.

11. The transfer case according to claim 10, wherein each slot extends between a first wall and a second wall, each protrusion engages the first wall of one of the slots when the inner annular member is in the first position, and each protrusion engages the second wall of one of the slots when the inner annular member is in the second position.

12. The transfer case according to claim 11, wherein torque is transferred from the inner annular member to the outer annular member by a spring when the inner annular member is in the first position and by the protrusions engaging the second walls when the inner annular member is in the second position.

13. The transfer case according to claim 12, wherein the primary output shaft includes a bore through which oil is supplied to the hub.

14. A hub for a transfer case, the hub comprising:
an outer annular member;
an inner annular member within and rotatable relative to the outer annular member in a limited range of motion between a first position and a second position relative to the outer annular member; and
a spring coupled to the outer annular member and the inner annular member, the spring normally biasing the inner annular member into the first position;
wherein the hub forms a closed valve when the inner annular member is in the first position, and the hub forms an open valve when the inner annular member is in the second position.

15. The hub according to claim 14, wherein the inner annular member includes a first plurality of apertures that extend radially outward through the inner annular member, and the outer annular member includes a second plurality of apertures that extend radially outward through the outer annular member; and
wherein the first plurality of apertures and the second plurality of apertures are not aligned when the inner annular member is in the first position and are aligned when the inner annular member is in the second position.

16. The hub according to claim 15, wherein the inner annular member includes a plurality of inner splines on an inner periphery thereof at circumferential positions between the first plurality of apertures and not at other circumferential positions of the first plurality of apertures.

17. The hub according to claim 15, wherein the first plurality of apertures are configured to receive oil from an output shaft to which the inner annular member is mounted, and the second plurality of apertures are configured to subsequently receive the oil from the first plurality of apertures.

18. The hub according to claim 14, wherein the inner annular member includes a plurality of protrusions that extend radially outward from an outer periphery thereof, the outer annular member includes a plurality of slots that extend radially outward from an inner periphery thereof, and the protrusions move within the slots in the limited range of motion between the first position and the second position.

19. The hub according to claim 18, wherein each slot includes a first end wall and a second end wall, the spring normally biases each protrusion against the first end wall when the inner annular member is in the first position, and the protrusions engage the second end wall to transfer torque thereto when the inner annular member is in the second position.

* * * * *